United States Patent
Brewer et al.

(10) Patent No.: US 8,391,101 B2
(45) Date of Patent: Mar. 5, 2013

(54) MARINE SEISMIC ACQUISITION WITH CONTROLLED STREAMER FLARING

(75) Inventors: Joel D. Brewer, Houston, TX (US); Peter M. Eick, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 103 days.

(21) Appl. No.: 12/167,683

(22) Filed: Jul. 3, 2008

(65) Prior Publication Data
US 2010/0002536 A1 Jan. 7, 2010

(51) Int. Cl.
*G01V 1/38* (2006.01)
(52) U.S. Cl. .......................................................... 367/16
(58) Field of Classification Search .............. 367/15–20; 114/242–254
See application file for complete search history.

(56) References Cited

U.S. PATENT DOCUMENTS

| | | | | |
|---|---|---|---|---|
| 3,840,845 A | * | 10/1974 | Brown | ............................. 367/19 |
| 5,353,223 A | | 10/1994 | Notron et al. | |
| 5,790,472 A | | 8/1998 | Workman et al. | |
| 5,973,995 A | | 10/1999 | Walker et al. | |
| 6,285,956 B1 | * | 9/2001 | Bennett et al. | ................... 702/14 |
| 6,691,038 B2 | | 2/2004 | Zajac | |
| 7,092,315 B2 | | 8/2006 | Olivier | |
| 7,162,967 B2 | | 1/2007 | Hillesund et al. | |
| 7,167,412 B2 | | 1/2007 | Tenghamn | |
| 7,203,130 B1 | | 4/2007 | Welker | |
| 2006/0227657 A1 | * | 10/2006 | Tveide et al. | ................... 367/16 |
| 2006/0256654 A1 | * | 11/2006 | Paulsen | ........................... 367/20 |
| 2009/0262601 A1 | * | 10/2009 | Hillesund et al. | ............... 367/16 |

FOREIGN PATENT DOCUMENTS

| | | |
|---|---|---|
| AU | 199220398 | 4/1993 |
| AU | B-20398/92 * | 7/1995 |
| EP | 0525391 A1 | 2/1993 |
| EP | 1879053 | 1/2008 |
| WO | 8403153 A1 | 8/1984 |
| WO | 9618117 A1 | 6/1996 |
| WO | WO 02/01250 | 1/2002 |

OTHER PUBLICATIONS

PCT "Notification of Transmittal of the International Search Report and the Written Opinion of the International Searching Authority, or the Declaration", Aug. 31, 2010, 14 pages.

* cited by examiner

*Primary Examiner* — Isam Alsomiri
*Assistant Examiner* — Krystine Breier
(74) *Attorney, Agent, or Firm* — ConocoPhillips Company (57) ABSTRACT

Marine seismic data is acquired with a system of steerable seismic streamers that are intentionally maintained in a flared configuration while the streamers are towed through a body of water.

37 Claims, 4 Drawing Sheets

MARINE SEISMIC ACQUISITION WITH CONTROLLED STREAMER FLARING

BACKGROUND

1. Field of the Invention

The present invention relates to seismic data acquisition. More particularly, the invention relates to the acquisition of seismic data in marine environments.

2. Brief Description of the Prior Art

Marine seismic exploration investigates and maps the structure and character of subsurface geological formations underlying a body of water. Marine seismic data is typically gathered by towing seismic sources (e.g., air guns) and seismic receivers (e.g., hydrophones) through a body of water behind one or more marine vessels. As the seismic sources and receivers are towed through the water, the seismic sources generate acoustic pulses that travel through the water and into the earth, where they are reflected and/or refracted by interfaces between subsurface geological formations. The seismic receivers sense the resulting reflected and/or refracted energy, thereby acquiring seismic data that provides information about the geological formations underlying the body of water.

Typically an array of thousands of seismic receivers is used to gather marine seismic data. The seismic receivers are generally attached to streamer cables that are towed behind the marine vessel. It is known that the relative positions of the marine seismic receivers during seismic data acquisition can affect the quality and utility of the resulting seismic data. However, unpredictable environmental forces such as currents, winds, and sea states present in many marine environments can cause the relative positions of marine seismic receivers to vary greatly as they are towed through the water. Therefore, it is common for steering devices (commonly know as "birds") to be attached to the streamer cables so that the relative positions (both lateral and vertical) of the seismic receivers can be controlled as they are towed through the water.

Figure 1:
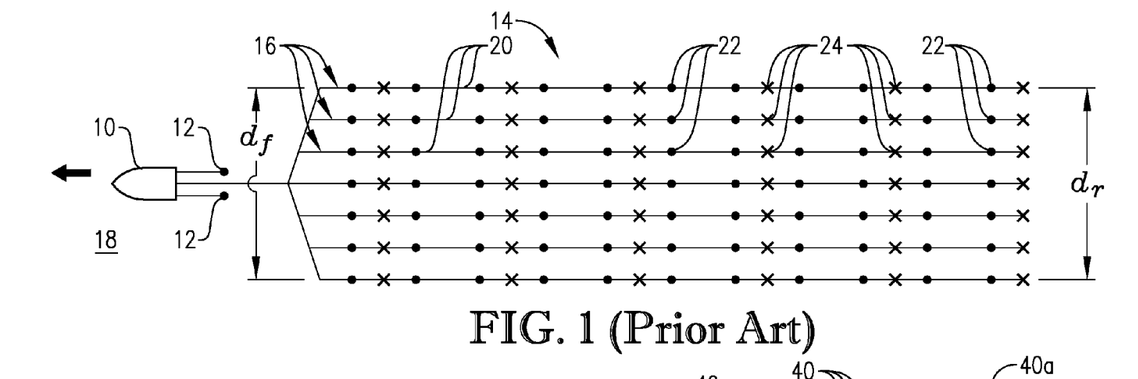
FIG. 1 is a simplified depiction of a conventional marine seismic acquisition system in a non-flared configuration where the lateral spacing between the streamers is substantially constant over the entire length of the streamers.

FIG. 1 is a simplified depiction of a conventional marine seismic data acquisition system employing a marine vessel 10 to tow seismic sources 12 and a system 14 of steerable seismic streamers 16 through a body of water 18. Each of the seismic streamers 16 includes a streamer cable 20, a series of seismic receivers 22 coupled to the cable 20, and a series of steering devices 24 coupled to the cable 20. As depicted in FIG. 1, during conventional marine seismic acquisition, the steering devices 24 are used to maintain substantially constant lateral spacing between the seismic streamers 16.

A common problem encountered with conventional marine seismic surveys is "gaps" in the acquired seismic data. These data gaps can occur when the spacing between adjacent acquisition passes is too large to provide sufficient resolution for proper data processing. Gaps in seismic data can be caused by a number of factors including, for example, skewing of the seismic streamers relative to the direction of travel of the towing vessel during data acquisition. Even when steerable streamers are employed, gaps in seismic data are common, particularly when strong crosscurrents are present. When strong crosscurrents are present during seismic data acquisition, it is not practical to maintain all the streamers in an orientation that is parallel to the direction of travel of the towing vessel because fighting strong crosscurrents with steering devices produces noise that dramatically reduces the quality of the gathered seismic data.

When gaps in marine seismic data are discovered, the areas corresponding to the data gaps must be resurveyed—a process commonly known as "shooting in-fill" or "in-filling." Unfortunately, the existence of gaps in marine seismic data may not be discovered until the initial marine seismic survey has been completed and the resulting seismic data is being processed. Obviously, in-filling is very undesirable because of the significant expense and time involved in resurveying in-fill areas that may be located hundreds of kilometers from one another or even retransiting the same vessel pass again to make up coverage.

SUMMARY OF THE INVENTION

In accordance with one embodiment of the present invention, marine seismic data is acquired using steerable seismic streamers that are towed through a body of water in a flared configuration. The flared streamer configuration can take a variety of forms. For example, in one embodiment, the flared streamer configuration can be characterized by the lateral distance between the outer-most, rearward-most seismic receivers being significantly greater than the lateral distance between the outer-most, front-most seismic receivers. In another embodiment, the flared streamer configuration can be characterized by a rearwardly increasing average streamer spacing. In still another embodiment, the flared streamer configuration can be characterized by the rearward-most group of seismic receivers having an average lateral spacing that is significantly greater than the front-most group of seismic receivers.

Although the prior art teaches that streamer flaring during seismic data acquisition should be avoided, the inventors have discovered that the use of controlled streamer flaring can reduce or eliminate the need for in-filling, without requiring more equipment or more acquisition passes than conventional marine seismic surveying techniques.

DETAILED DESCRIPTION OF THE PREFERRED EMBODIMENTS

Figure 2:
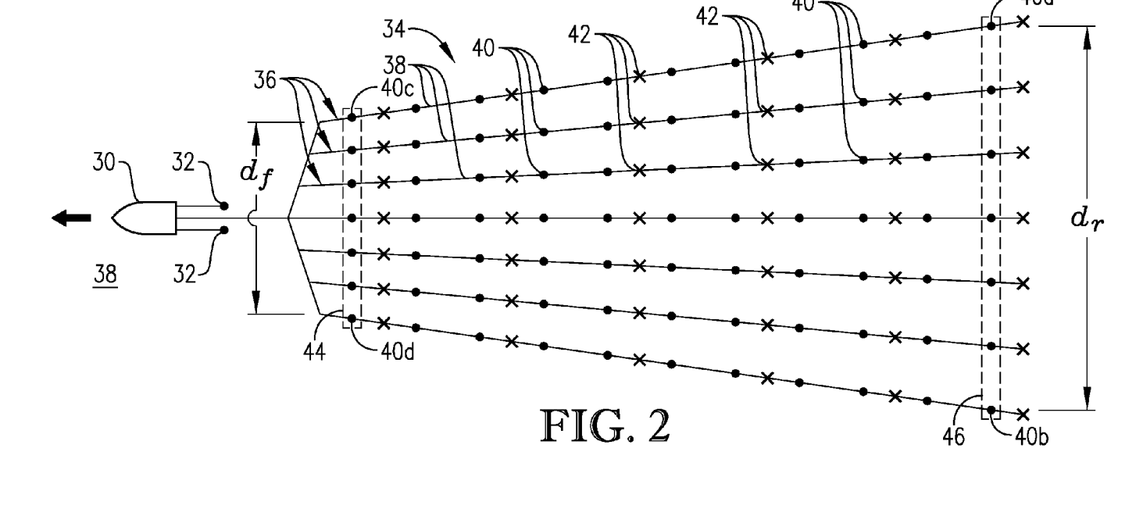
FIG. 2 is a simplified depiction of an exemplary inventive marine seismic acquisition system in a flared configuration, particularly illustrating a trapezoidally-shaped system of seismic streamers exhibiting lateral streamer spacing that increases rearwardly at a substantially constant rate over the entire length of the streamers.

Referring initially to FIG. 2, a marine seismic data acquisition system according to one embodiment of the present invention is illustrated as generally comprising a marine vessel 30, marine seismic sources 32, and a marine seismic streamer system 34. The marine seismic streamer system 34 of FIG. 2 is depicted in a flared configuration. In accordance with various embodiments of the inventive marine seismic data acquisition process described herein, the streamer system 34 is intentionally maintained in a flare configuration and is used to gather marine seismic data, while the marine vessel 30 tows the seismic sources 32 and the streamer system 34 through a body of water 38.

The marine vessel 30 can be any vessel capable of towing the seismic sources 32 and the seismic streamer system 34 through the body of water 38 at an appropriate speed. Generally, appropriate speeds for the marine seismic data acquisition methods of the present invention can be in the range of 2 to 10 knots, or most commonly 4 to 6 knots.

The marine seismic sources 32 can be any submersible acoustic wave source capable of generating wave energy powerful enough to propagate through the body of water 38 and into a subsea region of the earth, where it is reflected and/or refracted to thereby produce reflected/refracted energy that carries information about the structure of the subsea region and is detectable by marine seismic receivers. Although two seismic sources 32 are illustrated in FIG. 2, it may be desirable to use only one seismic source. Alternatively, the vessel may have no seismic source(s), such as in the case where the vessel is only towing streamers. Alternatively, it may be desirable to use three or more seismic sources in either single or multiple vessel operations. One skilled in the art will recognize that a variety of types of equipment can be employed as the seismic sources 32 depending on the conditions of the marine environment and design parameters of the seismic survey. In one embodiment, the marine seismic sources 32 are air guns. One example of a suitable air gun is available from ION Geophysical of Houston, Tex. under the commercial designation SLEEVE GUN™.

As illustrated in FIG. 2, the marine seismic streamer system 34 can include a plurality of laterally-spaced individual marine seismic streamers 36. The marine seismic streamers 36 can each include a streamer cable 38, a series of longitudinally-spaced marine seismic receivers 40 coupled to the cable 38, and a series of steering devices 42 coupled to the cable 38.

The marine seismic streamer system 34 can employ in the range of 2 to 100 individual seismic streamers 36, in the range of 4 to 50 individual seismic streamers 36, or in the range of 5 to 25 individual seismic streamers 36. At least two of the seismic streamers 36 can have a length in the range of 0.5 to 30 kilometers, in the range of 2 to 20 kilometers, or in the range of 4 to 12 kilometers. In one embodiment, at least one-half of the seismic streamers 36 employed in the seismic streamer system 34 have a length within one or more of the above-recited ranges. In another embodiment, all of the seismic streamers 36 employed in the seismic streamer system 34 have a length within one or more of the above-recited ranges.

The individual seismic streamers 36 can each include in the range of 10 to 300,000 individual seismic receivers 40, in the range of 100 to 10,000 individual seismic receivers 40, or in the range of 200 to 1,000 individual seismic receivers 40. The seismic receivers 40 employed in the present invention can be selected from a wide variety of commonly known marine seismic receivers. One example a suitable seismic receiver is available from Teledyne Benthos of North Falmouth, Mass. under the commercial designation AQ-2000™.

The seismic streamers 36 illustrated in FIG. 2 are steerable streamers whose lateral positions can be controlled by the steering devices 42 as the streamers 36 are towed through the water 38. The individual seismic streamers 36 can each include at least 3 steering devices 42, at least 10 steering devices 42, or at least 20 steering devices. Although all the seismic streamers 36 depicted in FIG. 2 are steerable streamers that include steering devices 42, it should be understood that one or more of the streamers 36 may not be equipped with any steering devices. In one embodiment, at least one-half of the seismic streamers 36 are steerable streamers equipped with steering devices 42. The steering devices 42 employed in the present invention can be selected from a wide variety of commonly known steering devices. In accordance with one embodiment of the present invention, the steering devices 42 are capable of controlling both the lateral position and the depth of the seismic streamers 36 in the body of water 38. One such steering device is available from WesternGeco LLC of Houston, Tex. under the commercial designation Q-FIN™.

As noted above, FIG. 2 depicts the seismic streamer system 34 in a flared configuration, where the rear portion of the streamer system 34 is wider than the front portion of the streamer system 34. In accordance with one embodiment of the present invention, the seismic streamer system 34 is in a flared configuration when the lateral distance ($d_r$) between the outer-most, rearward-most seismic receivers 40a,b is greater than the lateral distance ($d_f$) between the outer-most, front-most seismic receivers 40c,d. In other embodiments, the seismic streamer system 34 is in a flared configuration when the lateral distance ($d_r$) between the outer-most, rearward-most seismic receivers 40a,b is at least 2 percent, at least 5 percent, at least 10 percent, at least 20 percent, or in the range of 30 to 400 percent greater than the lateral distance ($d_f$) between the outer-most, front-most seismic receivers 40c,d.

Referring again to FIG. 2, the average spacing between adjacent seismic receivers 40 of a front-most group 44 of seismic receivers 40 can be in the range of 0.1 to 300 meters, in the range of 1 to 100 meters, or in the range of 4 to 50 meters. The average spacing between adjacent seismic receivers 40 of a rearward-most group 46 of seismic receivers 40 can be at least 2 percent, at least 5 percent, at least 10 percent, at least 20 percent, or in the range of 30 to 400 percent greater than the average spacing between adjacent receivers 40 of the front-most group 44 of seismic receivers 40. The average spacing between adjacent seismic receivers 40 of the rearward-most group 46 of seismic receivers 40 can be in the range of 10 to 500 meters, in the range of 15 to 250 meters, or in the range of 25 to 150 meters.

The seismic streamer system 34 depicted in FIG. 2 has a generally trapezoidal shape, with a substantially constant rate of flaring along the entire length of the seismic streamer system 34. As used herein, the term "rate of flaring" is used to denote the rate at which the average spacing between adjacent seismic streamers increases rearwardly along a certain length of the seismic streamer system.

Figure 3:
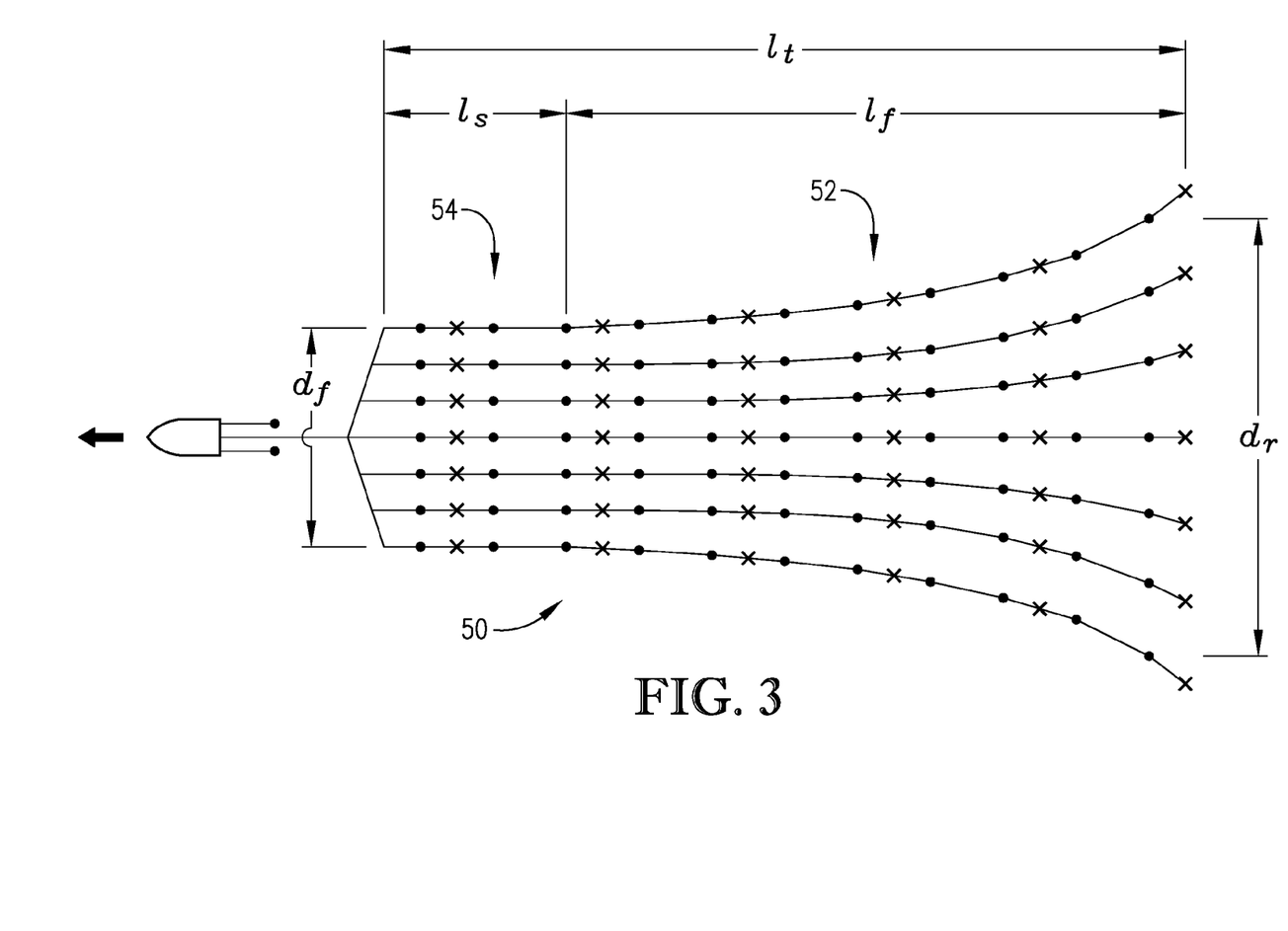
FIG. 3 is a simplified depiction of an exemplary inventive marine seismic acquisition system in a flared configuration, particularly illustrating a trumpet-shaped system of seismic streamers exhibiting lateral streamer spacing that increases rearwardly at an increasing rate.

FIG. 3 depicts an alternative seismic streamer system 50 in a flared configuration. In particular, seismic streamer system 50 has a trumpet-shaped configuration, with a rearwardly increasing rate of flaring in a flared section 52 of the seismic streamer system 50. As used herein, the "flared section" of a seismic streamer system is simply the section of the seismic streamer system that is in a flared configuration. Thus, for the seismic streamer system 34 of FIG. 1, the entire length of the streamer system 34 would be considered a flared section. However, for the seismic streamer system 50 of FIG. 3, the flared section 52 has a length ($l_f$) that is less than the total length ($l_t$) of the seismic streamer system 50. As depicted in FIG. 3 the seismic streamer system 50 can also include a non-flared/straight section 54 that exhibits a substantially constant streamer spacing over its length ($l_s$).

In accordance with various embodiments of the present invention, the length ($l_f$) of the flared section of a seismic streamer system can be at least 5 percent, at least 10 percent, at least 20 percent, at least 40 percent, at least 60 percent, at least 80 percent, or at least 100 percent of the total length ($l_t$) of the seismic streamer system. In accordance with embodiments of the present invention, the flared section of a seismic streamer system can exhibit an average lateral spacing between adjacent seismic streamers that increases rearwardly at a rate of at least 0.001 meters (lateral) per meter (longitudinal), at least 0.002 meters per meter, at least 0.005 meters per meter, at least 0.01 meters per meter, at least 0.05 meters per meter, or at least 0.1 meters per meter.

Figure 4:
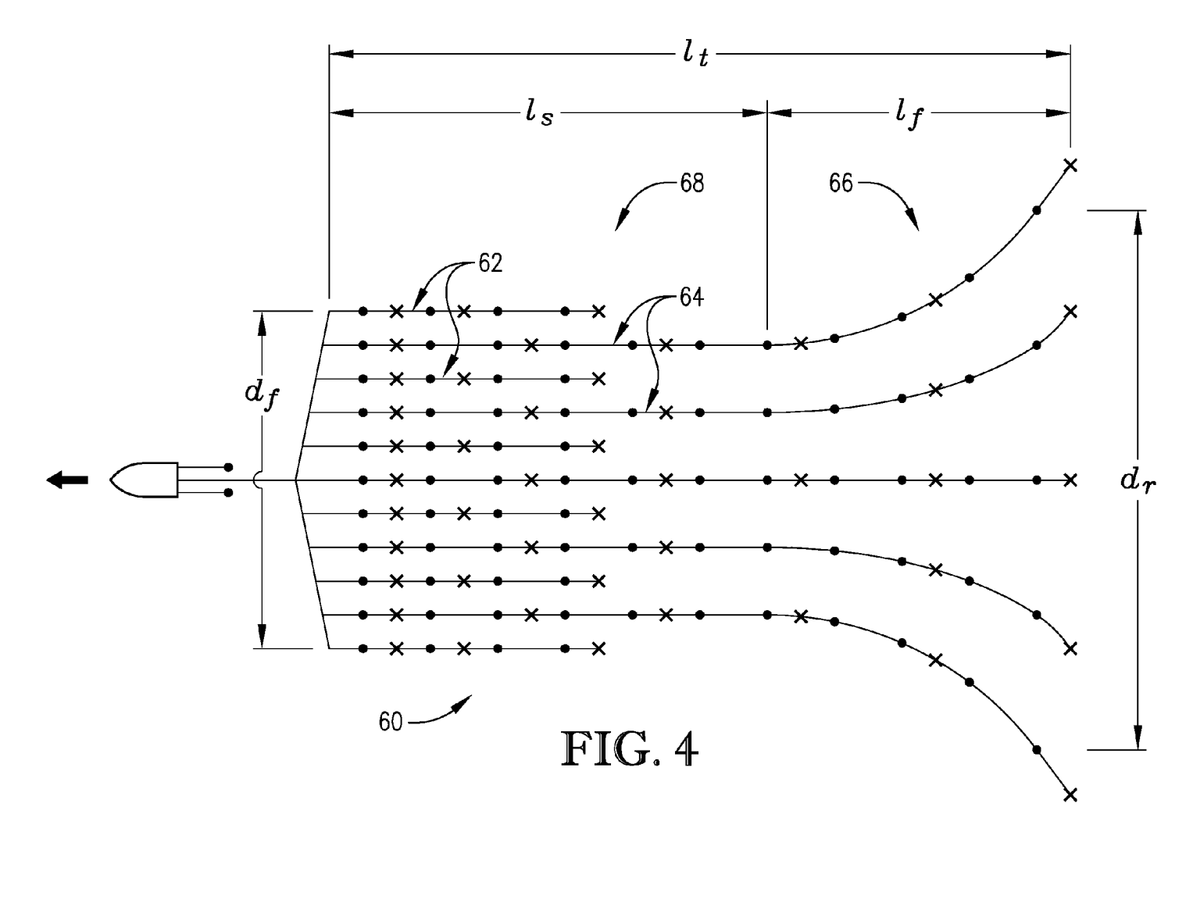
FIG. 4 is a simplified depiction of an exemplary inventive marine seismic acquisition system in a flared configuration, particularly illustrating a trumpet-shaped system of variable length seismic streamers exhibiting lateral streamer spacing that increases rearwardly at an increasing rate.

FIG. 4 depicts and alternative seismic streamer system 60 in a flared configuration. The seismic streamer system 60 illustrated in FIG. 4 includes alternating short streamers 62 and long streamers 64. In the configuration illustrated in FIG. 4, the short streamers 62 are not in a flared configuration, but the long streamers 64 include a flared section 66 having a length ($l_f$) that is less than the total length ($l_t$) of the seismic streamer system 60. The seismic streamer system 60 also includes a non-flared/straight section 68 having a length ($l_s$) that is less than the total length ($l_t$) of the seismic streamer system 50.

Figure 5:
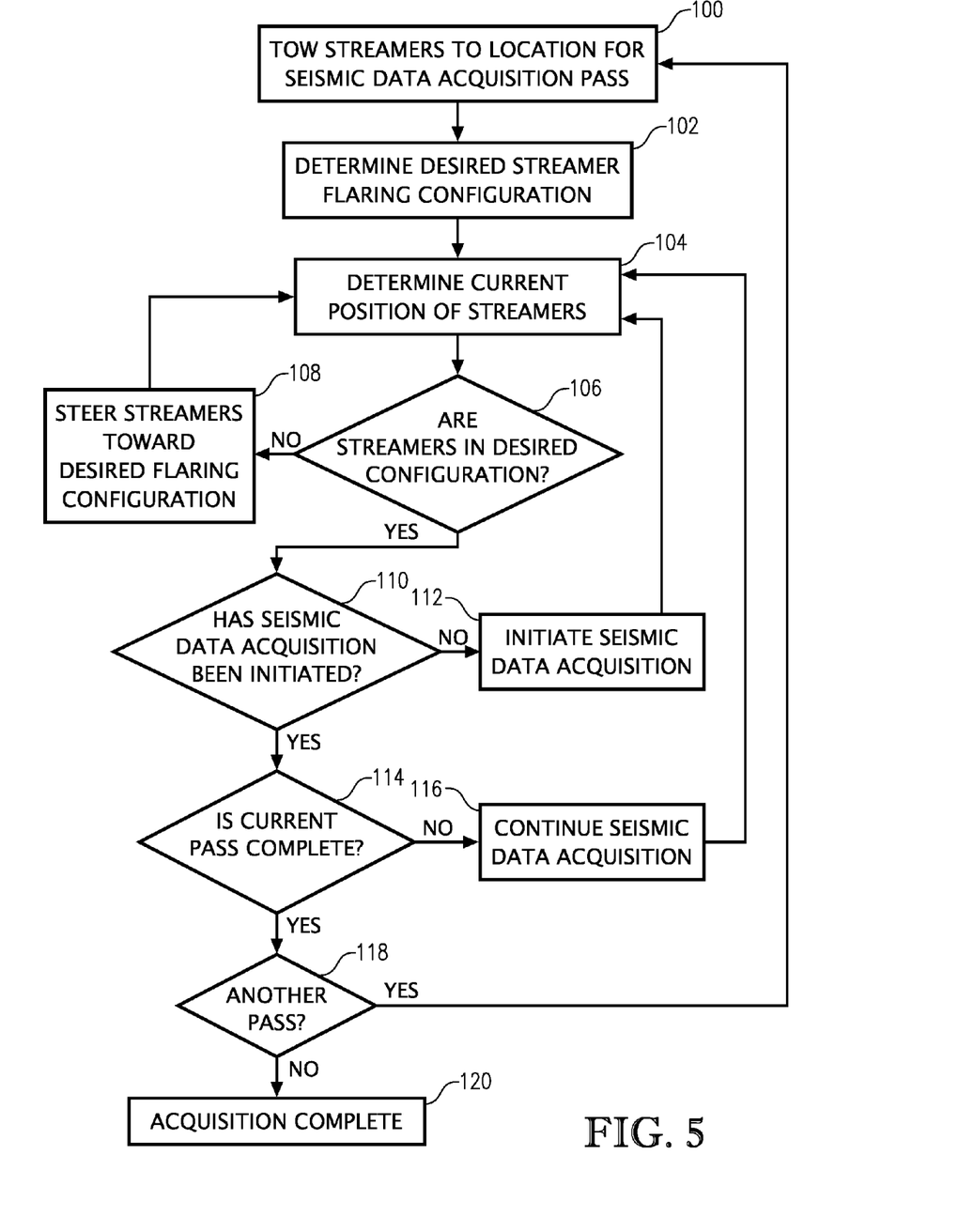
FIG. 5 outlines certain steps that can be used to carry out a marine seismic data acquisition.

FIG. 5 outlines certain steps that can be used to carry out a marine seismic data acquisition method according to embodiments of the present invention. In step 100, a marine vessel tows a seismic streamer system to a location where a seismic data acquisition pass is to be performed. In step 102, a desired flared streamer configuration is determined. As discussed above, a wide variety of flared streamer configurations can be employed in the seismic data acquisition process. These flared streamer configurations include, but are not limited to, configurations similar to those depicted in FIGS. 2-4.

In step 104, while the seismic streamer system is being towed through the water, the relative positions of the streamers and/or seismic receivers are checked to determine if the seismic streamer system is in the desired flared configuration. In step 106, a determination is made as to whether the seismic streamer system is in the desired flared configuration. If the seismic streamer system is not in the desired flared configuration, step 108 adjusts the steering devices so as to steer to seismic streamer system from an undesirable, non-flared configuration toward the desired flared configuration. Steps 104, 106, and 108 can then be repeated until the seismic streamer system is in the desired flared configuration.

As depicted in steps 110 and 112, once the seismic streamer system is in the desired flared configuration, seismic data acquisition can be initiated by exciting marine seismic sources and detecting reflected and/or refracted wave energy with the seismic receivers of the seismic streamer system. After initiation of seismic data acquisition, steps 104, 106, 108 can be repeated in order to ensure that the seismic streamer system is in the desired flared configuration. In step 114, decision is made whether or not the current seismic data acquisition pass is complete. As depicted in step 116, if the current seismic data acquisition pass is not complete, seismic data acquisition is continued. Thereafter, steps 104, 106, 108, 110, 114, and 116 are repeated to ensure that the seismic streamer system is maintained in the desired flared configuration during seismic data acquisition. After it is determined in step 114 that the current seismic data acquisition pass is complete, a determination is made in step 118 as to whether another seismic data acquisition pass is desired. If another pass is desired, the process returns to step 100. If another pass is not desired, the seismic data acquisition process is complete, as depicted in step 120.

As mentioned above, the marine seismic data acquisition method according to embodiments of the present invention intentionally controls the position of the seismic streamers in a flared configuration while the streamers are being towed through the water and seismic data is being acquired. In certain embodiments of the present invention, the seismic streamer system is continuously maintained in a flared configuration over a controlled flaring distance of at least one kilometer, at least five kilometers, or at least 15 kilometers. In certain embodiments of the present invention, the seismic streamer system is continuously maintained in the flared configuration for a controlled flaring time of at least five minutes, at least 20 minutes, at least 60 minutes, or at least 120 minutes. During the controlled flaring time and/or over the controlled flaring distance, the seismic streamer system is used to gather marine seismic data.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" mean one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above. As used herein, the terms "including," "includes," and "include" have the same open-ended meaning as "comprising," "comprises," and "comprise," provided above.

Claims not Limited to Disclosed Embodiments

The preferred forms of the invention described above and depicted in the drawings are to be used as illustration only, and should not be used in a limiting sense to interpret the scope of the present invention. Modifications to the exemplary embodiments, set forth above, could be readily made by those skilled in the art without departing from the spirit and scope of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A method of acquiring seismic data in a marine environment, said method comprising:

(a) towing a system of 4 to 50 laterally-spaced steerable seismic streamers through a body of water, wherein each of said seismic streamers has a front portion and a rear portion wherein the front portion of each streamer is laterally spaced from the front portions of other streamers in the system each streamer comprises a series of longitudinally-spaced marine seismic receivers characterized by:
(b) simultaneously with step (a), steering said system of seismic streamers into a flared configuration where (i) all the streamers have a length of between 2 kilometers and 20 kilometers, (ii) the lateral distance between the outer-most, rearward-most marine seismic receivers at the rear portions of the streamers is at least 2 percent greater than the lateral distance between the outer-most, forward-most marine seismic receivers, (iii) the average spacing between adjacent seismic receivers of the rearward-most group of seismic receivers is in the range of 15 to 250 meters;
(c) simultaneously with steps (a) and (b), recording reflected and/or refracted seismic data with said marine seismic receivers; and
(d) towing the system of laterally-spaced seismic streamers in the flared configuration as described in step (b) through a survey area that is divided into a number of adjacent acquisition passes wherein gaps are avoided between adjacent passes in the seismic data collected by the marine seismic receivers.

2. The method of claim 1 wherein where said system of seismic streamers is said flared configuration the lateral distance between the outer-most, rearward-most marine seismic receivers is at least 5 percent greater than the lateral distance between the outer-most, forward-most marine seismic receivers.

3. The method of claim 1 wherein when said system of seismic streamers is in said flared configuration the average lateral spacing between said seismic streamers in a flared section of said system of seismic streamers increases rearwardly at a rate of at least 0.001 meters per meter, wherein said flared section of said system of seismic streamers has a length that is at least 20 percent of the total length of said system of seismic streamers.

4. The method of claim 1 wherein at least two of said seismic streamers include a series of longitudinally-spaced steering devices capable of controlling the lateral position of said seismic streamers during said towing of step (a).

5. The method of claim 4 wherein each of said seismic streamers comprises at least three of said steering devices.

6. The method of claim 4 wherein said steering devices are capable of simultaneously controlling both the lateral position and the depth of said seismic streamers in said body of water.

7. The method of claim 1 wherein said system of seismic streamers comprises in the range of 3 to 100 individual streamers.

8. The method of claim 1 wherein each of seismic streamers comprises in the range of 10 to 300,000 of said marine seismic receivers.

9. The method of claim 1 wherein said towing of step (a) is carried out at a speed in the range of 2 to 10 knots.

10. The method of claim 1 wherein at least one-half said seismic streamers comprise a series of longitudinally-spaced steering devices capable of controlling the lateral position of said seismic streamers during said towing of step (a), wherein said system of seismic streamers comprises in the range of 4 to 50 individual streamers, wherein each of said seismic streamers has a length in the range of 2 to 20 kilometers, wherein each of said seismic streamers includes in the range of 100 to 10,000 of said marine seismic receivers, wherein the average lateral spacing between a forward-most group of said marine seismic receivers is in the range of 1 to 100 meters, wherein the average lateral spacing between a rearward-most group of said marine seismic receivers is at least 10 percent greater than the average lateral spacing between said forward-most group of said marine seismic receivers.

11. The method of claim 1 wherein said system of seismic streamers is continuously maintained in said flared configuration over a controlled flaring distance of at least one kilometer, wherein over said controlled flaring distance the average lateral distance between the outer-most, rearward-most marine seismic receivers is at least 10 percent greater than the average lateral distance between the outer-most, forward-most marine seismic receivers.

12. The method of claim 11, wherein said controlled flaring distance is at least five kilometers, wherein over said controlled flaring distance the average lateral distance between the outer-most, rearward-most marine seismic receivers is at least 20 percent greater than the average lateral distance between the outer-most, forward-most marine seismic receivers.

13. The method of claim 12 wherein each of said seismic streamers comprises a series of longitudinally-spaced steering devices capable of controlling the lateral position of said seismic streamers during said towing of step (a), wherein said system of seismic streamers comprises in the range of 5 to 25 individual streamers, wherein each of said seismic streamers has a length in the range of 4 to 12 kilometers, wherein each of said seismic streamers includes in the range of 200 to 1,000 of said marine seismic receivers, wherein the average lateral spacing between a forward-most group of said marine seismic receivers is in the range of 4 to 50 meters.

14. A method of acquiring seismic data for a subsea region of the earth, said method comprising:
(a) using a marine vessel to tow at least one marine seismic source and a system of at least four laterally-spaced seismic streamers through a body of water, wherein each of said seismic streamers comprises a series of at least 100 longitudinally-spaced marine seismic receivers, wherein at least one-half of said seismic streamers include steering devices capable of controlling the lateral position of said seismic streamers during towing and wherein each streamer has a front portion and a rear portion wherein the front portion of each streamer is laterally spaced from the front portions of other streamers in the system;
(b) simultaneously with step (a), maintaining said system of seismic streamers in a flared configuration over a controlled flaring distance of at least five kilometers, wherein when said system of seismic streamers is in said flared configuration the average lateral spacing between said seismic streamers in a flared section of said system of seismic streamers increases rearwardly at a rate of at least 0.001 meters per meter, wherein said flared section has a length that is at least 5 percent of the total length of said system of seismic streamers and wherein the average spacing between adjacent seismic receivers of the rearward-most group of seismic receivers does not exceed 250 meters;
(c) simultaneously with steps (a) and (b), exciting said at least one marine seismic source to thereby causing wave energy to travel through said body of water and into said subsea region of the earth;
(d) simultaneously with steps (a) and (b), detecting reflected and/or refracted wave energy with said marine seismic receivers, wherein the detected wave energy contains seismic information about said subsea region of the earth; and (e) towing the system of laterally-spaced seismic streamers in the flared configuration as described in step (b) through a survey area that is divided into a number of adjacent acquisition passes wherein gaps are avoided between adjacent passes in the seismic data collected by the marine seismic receivers.

15. The method of claim 14 wherein said flared section has a length that is at least 40 percent of the total length of said system of seismic streamers.

16. The method of claim 14 wherein the average lateral spacing between said seismic streamers in said flared section includes rearwardly at a rate of at least 0.01 meters per meter.

17. The method of claim 14 wherein said flared section has a length that is at least 60 percent of the total length of said system of seismic streamers, wherein the average lateral spacing between said seismic streamers in said flared section increases rearwardly at a rate of at least 0.002 meters per meter.

18. The method of claim 14 wherein when said system of seismic streamers is in said flared configuration the lateral distance between the outer-most, rearward-most marine seismic receivers is at least 5 percent greater than the lateral distance between the outer-most, forward-most marine seismic receivers.

19. The method of claim 14 wherein said steering devices are capable of simultaneously controlling both the lateral position and the depth of said seismic streamers in said body of water.

20. The method of claim 14 wherein a plurality of said seismic streamers have a length in the range of 2 to 20 kilometers.

21. The method of claim 14 wherein the average lateral spacing between a forward-most group of said marine seismic receivers is in the range of 1 to 100 meters, wherein the average lateral spacing between a rearward-most group of said marine seismic receivers is at least 10 percent greater than the average lateral spacing between said forward-most group of said marine seismic receivers.

22. The method of claim 14 wherein said towing of step (a) is carried out at a speed in the range of 4 to 8 knots.

23. The method of claim 14 wherein said system of seismic streamers comprises in the range of 4 to 50 individual streamers, wherein each of said seismic streamers has a length of at least four kilometers, wherein each of said seismic streamers includes at least 200 of said marine seismic receivers.

24. The method of claim 14, wherein said controlled flaring distance is at least 15kilometers, wherein over said controlled flaring distance the average lateral distance between the outer-most, rearward-most marine seismic receivers is at lest 10 percent greater than the average lateral distance between the outer-most, forward-most marine seismic receivers.

25. A method of acquiring marine seismic data, said method comprising:

(a) determining a desired flared configuration for a system of between 4 and 50 marine seismic streamers wherein the streamers have a length of between 2 kilometers and 20 kilometers and the average spacing between adjacent seismic receivers of the rearward-most group of seismic receivers is in the range of 15 to 250 meters;

(b) towing said system of marine seismic streamers through a body of water;

(c) simultaneously with step (b), steering said system of marine seismic streamers from a non-flared configuration into said desired flared configuration wherein each streamer has a front portion and a rear portion wherein the front portion of each streamer is laterally spaced from the front portions of other streamers in the system in both the flared and non-flared configurations;

(d) simultaneously with step (b), maintaining said system of marine seismic streamers in said desired configuration for a controlled flaring time of at least 5 minutes through a survey area that is divided into a number of adjacent acquisition passes wherein gaps are avoided between adjacent passes in the seismic data collected by the marine seismic receivers in adjacent acquisition passes; and (e) using said system of marine seismic streamers to acquire marine seismic data during said controlled flaring time.

26. The method of claim 25 wherein during said controlled flaring time said system of marine seismic streamers is towed through said body of water at an average speed in the range of 2 to 10 knots.

27. The method of claim 25 wherein said controlled flaring time is at least 30minutes, wherein during said controlled flaring time said system of marine seismic streamers is towed through said body of water at an average speed in the range of 4 to 8knots.

28. The method of claim 25 wherein each of said marine seismic streamers comprises a series of seismic receivers, wherein when said system of seismic streamers is in said desired flared configuration the lateral distance between the outer-most, rearward-most marine seismic receivers is at least five percent greater than the lateral distance between the outer-most, forward-most marine seismic receivers.

29. The method of claim 28 wherein when said system of seismic streamers is in said desired flared configuration the lateral distance between the outer-most, rearward-most marine seismic receivers is at least 10 percent greater than the lateral distance between the outer-most, forward-most marine seismic receivers.

30. The method of claim 25 wherein when said system of marine seismic streamers in said desired flared configuration a flared section of said system of marine seismic streamers exhibits an average lateral spacing between said marine seismic streamers that increases rearwardly at a rate of at least 0.001 meters per meter.

31. The method of claim 30 wherein said flared section has a length that is at least 20 percent of the total length of said system of marine seismic streamers.

32. The method of claim 30 wherein said flared section has a length that is at least 60 percent of the total length of said system of marine seismic streamers.

33. The method of claim 30, wherein said flared section exhibits an average lateral spacing betweens aid marine seismic streamers that increases rearwardly at a rate of at least 0.002 meters per meter.

34. The method of claim 30 wherein said flared section has a length that is at least 40 percent of the total length of said system of marine seismic streamers.

35. The method of claim 1 wherein gaps in the seismic data between adjacent acquisition passes at the outer-most seismic receivers at the front portions of the system are avoided at the same time that gaps in the seismic data between adjacent acquisition passes at the outer-most seismic receivers at the rear portion of the system are avoided by a flared streamers that extend wider to cover portions of the survey area that due to cross currents might have been missed.

36. The method of claim 1 further comprising steering the system of laterally-spaced steerable seismic streamers into the flared configuration during successive adjacent passes so as to avoid gaps in the seismic data between adjacent acquisition passes at the outer-most seismic receivers at the front portions of the system and so as to avoid gaps in the seismic data between adjacent acquisition passes at the outer-most seismic receivers at the rear portion of the system.

37. The method of claim 1 wherein the recorded seismic data is processed to create a model of the subsurface geological formations in the seismic survey area.

* * * * *